US012115567B2

(12) United States Patent
Erwin et al.

(10) Patent No.: US 12,115,567 B2
(45) Date of Patent: Oct. 15, 2024

(54) CLEANING ENGINE INTAKE VALVES AND SURROUNDING INTAKE AREAS

(71) Applicant: BG Intellectuals, Inc., Witchita, KS (US)

(72) Inventors: Michael Jason Erwin, Augusta, KS (US); Paul Frederick Garcia, Maize, KS (US); Thomas Michael Probus, Wichita, KS (US); John D. Cheek, Wichita, KS (US); Tomas Garcia, Goddard, KS (US)

(73) Assignee: BG Intellectuals, Inc., Wichita, KS (US)

(*) Notice: Subject to any disclaimer, the term of this patent is extended or adjusted under 35 U.S.C. 154(b) by 0 days.

(21) Appl. No.: 16/543,260

(22) Filed: Aug. 16, 2019

(65) Prior Publication Data

US 2020/0055101 A1 Feb. 20, 2020

Related U.S. Application Data

(60) Provisional application No. 62/765,043, filed on Aug. 17, 2018.

(51) Int. Cl.

*B08B 9/027* (2006.01)
*B08B 9/34* (2006.01)
(Continued)

(52) U.S. Cl.

CPC ................ *B08B 9/027* (2013.01); *B08B 9/34* (2013.01); *F02B 77/04* (2013.01);
(Continued)

(58) Field of Classification Search

CPC .............. F02B 77/04; F02M 35/10242; F02M 26/00–74; F02M 65/007–008;
(Continued)

(56) References Cited

U.S. PATENT DOCUMENTS 4,359,971 A * 11/1982 Rogers ............... F02M 25/0225
123/25 D
4,989,561 A 2/1991 Hein et al.
(Continued)

OTHER PUBLICATIONS

International Preliminary Report on Patentability received for PCT Application No. PCT/US2019/046921, mailed on Sep. 21, 2020, 8 pages.
(Continued)

*Primary Examiner* — Mikhail Kornakov
*Assistant Examiner* — Richard Z. Zhang
(74) *Attorney, Agent, or Firm* — Shook, Hardy & Bacon L.L.P.

(57) ABSTRACT

Systems and methods provide for cleaning the air intake valves and surrounding areas of an engine. A gravity-fed cleaning-fluid dispenser may feed cleaning fluid into a hose through a metered device that meters a rate at which the cleaning fluid flows into the hose. A second fluid meter connected to a distal end of the hose further meters the rate at which a mixture of the cleaning fluid and air from is dispersed into the running GDI engine. Cleaning fluid may be distributed to the engine at a gradually decreasing rate as a volume of cleaning fluid in the dispenser decreases as the service progresses.

20 Claims, 9 Drawing Sheets

(51) Int. Cl.

| | |
|---|---|
| ***B65D 83/14*** | (2006.01) |
| ***F02B 77/04*** | (2006.01) |
| ***F02M 35/10*** | (2006.01) |
| ***F02M 65/00*** | (2006.01) |
| *B08B 9/00* | (2006.01) |

(52) U.S. Cl.
CPC .... *F02M 35/10242* (2013.01); *F02M 65/008* (2013.01); *B08B 9/00* (2013.01); *B65D 83/14* (2013.01); *F02M 65/007* (2013.01)

(58) Field of Classification Search
CPC ..... C11D 11/0041; C10L 10/06; B65D 83/14; B65D 83/68; B65D 83/682; B65D 83/75; B65D 83/752; B08B 9/027–057; F02D 1/00–45/00
See application file for complete search history.

(56) References Cited

U.S. PATENT DOCUMENTS

| | | | | | |
|---|---|---|---|---|---|
| 6,073,638 | A | 6/2000 | Sasaki et al. | | |
| 6,178,977 | B1 | 1/2001 | Wells | | |
| 6,478,036 | B1 * | 11/2002 | Connors | F02M 35/10222 | 134/102.2 |
| 2002/0107161 | A1 * | 8/2002 | Gatzke | C11D 3/30 | 510/185 |
| 2002/0117207 | A1 * | 8/2002 | Blatter | F02B 77/04 | 137/240 |
| 2003/0158060 | A1 | 8/2003 | Ahmadi et al. | | |
| 2003/0178000 | A1 * | 9/2003 | Augustus | F02B 77/04 | 123/198 A |
| 2007/0029139 | A1 * | 2/2007 | Erwin | F01M 11/04 | 184/1.5 |
| 2008/0011327 | A1 * | 1/2008 | Shriner | B08B 9/00 | 510/185 |
| 2008/0283098 | A1 | 11/2008 | Ogasawara et al. | | |
| 2011/0226213 | A1 * | 9/2011 | Horriat | F02M 65/007 | 123/198 A |
| 2015/0108252 | A1 | 4/2015 | Ogawa | | |
| 2018/0002645 | A1 | 1/2018 | Bartley et al. | | |

OTHER PUBLICATIONS

International Search Report and Written Opinion mailed Oct. 28, 2019 in International Patent Application No. PCT/US2019/046921, 12 pages.

* cited by examiner

CLEANING ENGINE INTAKE VALVES AND SURROUNDING INTAKE AREAS

CROSS-REFERENCE TO RELATED APPLICATIONS

This application claims the benefit of U.S. Provisional Application No. 62/765,043, filed on Aug. 17, 2018, which is hereby incorporated by reference in its entirety.

BACKGROUND

Motor vehicle engines, whether they use gasoline or diesel fuel, have three fundamental components that participate in the combustion process—an air intake duct, a combustion chamber (or chambers), and an exhaust duct. Typically, engines build up deposits of carbon and oil on the intake and exhaust valves during both the combustion process and the cool off period after the engine is shut down. In some engines, air (containing oxygen) is taken in through an air intake system and mixed with fuel prior to entering the combustion chamber. For instance, the fuel might be injected into the intake manifold, located just above the intake valve(s), of the engine. This allows the fuel to pass over the intake valve(s) while being sucked into the combustion chamber, which helps clean some of the accumulation of carbon and oil from the valve(s).

However, in many modern vehicle gasoline engines, namely gasoline direct injection (GDI) engines, the fuel is injected directly into the combustion chamber. While this often makes the combustion process more efficient and improves the fuel mileage of the vehicle, since there is no fuel travelling over the intake valves, instead of being washed off, deposits might now build up and bake on the intake valves, effectively disturbing the air flow into the combustion chamber. This often leads to decreased engine efficiency. Further, as the buildup of deposits increases, it can prevent the intake valve(s) from completely sealing during the closing cycle of combustion, leading to backwards exhaustion of fuel through the intake system. This may, in certain instances, lead to damage of engine components and a further reduction in engine efficiency.

Prior solutions include spraying a cleaner into the mouth of the air intake of the engine while the engine is running to get at least a portion of the cleaner to reach the intake valve(s) by floating on the air sucked in to the combustion chamber. However, in most cases, the cleaner does not reach the valve(s) as the highly atomized cleaner falls out of the suspension before arrival due to the long distance between the mouth of the intake assembly and the valve(s). Additionally, conventional intake designs, such as updraft and 360 degree loops, do not allow a cleaner to float in the airstream for a time period long enough for the cleaner to reach the intake valve(s). Further, in order to clean intake valves while the engine is running, the cleaner is required to have severe atomization to be able to float in the air stream. Such high atomization requires a higher volume of cleaner to remove baked on deposits, which can flood and thereby kill the engine, leading to further damage in the combustion chamber.

Other solutions require removing major engine components, such as the intake manifold, to access the intake valves themselves to then directly clean the valves. As such, there is a need in the art for a cleaning technique and device that permits reliable and efficient cleaning of intake valves and the surrounding areas and that does not require removing major engine components.

SUMMARY

The present disclosure relates generally to cleaning engine systems, such as those of gasoline direct injection (GDI) engines. More specifically, the present disclosure relates to a method and an apparatus for cleaning the intake valves and surrounding areas of engines. For instance, the present disclosure describes using a device to introduce a cleaning fluid into a vacuum port at an intake site of a vehicle at metered rates using a gravity-fed, non-pressurized tool. The device is configured such that the cleaning fluid is introduced to the intake site at a higher rate when the fluid dispenser is full and is gradually slowed as the cleaning fluid leaves the fluid dispenser. As compared to conventional systems and methods, this allows for more effective cleaning and restoration of intake valves and surrounding areas while the engine is running, without removing any major engine components.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present systems and methods for cleaning engine air intake valve(s) and surrounding areas are described in detail below with reference to the attached drawing figures, wherein.

DETAILED DESCRIPTION

The present disclosure includes an apparatus that allows a user to clean the air intake valve(s) and surrounding areas of an engine (e.g., gasoline direct injection (GDI) engine) and avoid the problems inherent in the prior art. Various portions of this disclosure may reference a GDI engine, and in some aspects, the systems and methods of this disclosure might be used with a GDI engine. These systems and methods may also be used with other types of engines. The apparatus is a gravity-fed tool that uses a fluid dispenser and a dual-meter assembly to cause a varied flow of cleaning fluid into the GDI engine's intake assembly, which may more efficiently and more effectively cleaning not only the intake valves, but also the combustion chamber and the surrounding areas of the engine. The varied flow helps carry the cleaning fluid, injected into the air stream, throughout the air intake system and the combustion chamber. As a result, the entire air intake system and the surrounding areas might be cleaned without the need to remove any major engine components.

A gravity-fed cleaning tool includes a fluid dispenser and allows for a higher volume of the cleaning fluid to flow into the intake manifold in the beginning when the head pressure in the fluid dispenser is higher. This allows for fully coating and saturating of the deposits on the valve, piston and the combustion chamber, thereby also allowing for a longer cleaning fluid soak time of the deposit at those areas, since the cleaning fluid is first deposited in those regions (i.e., earlier in the servicing process). The flow rate of the cleaning fluid is gradually decreased over time as the head pressure goes down in the fluid dispenser. This variable flow rate of the cleaning fluid allows for improved cleaning of the air intake system.

Figure 1:
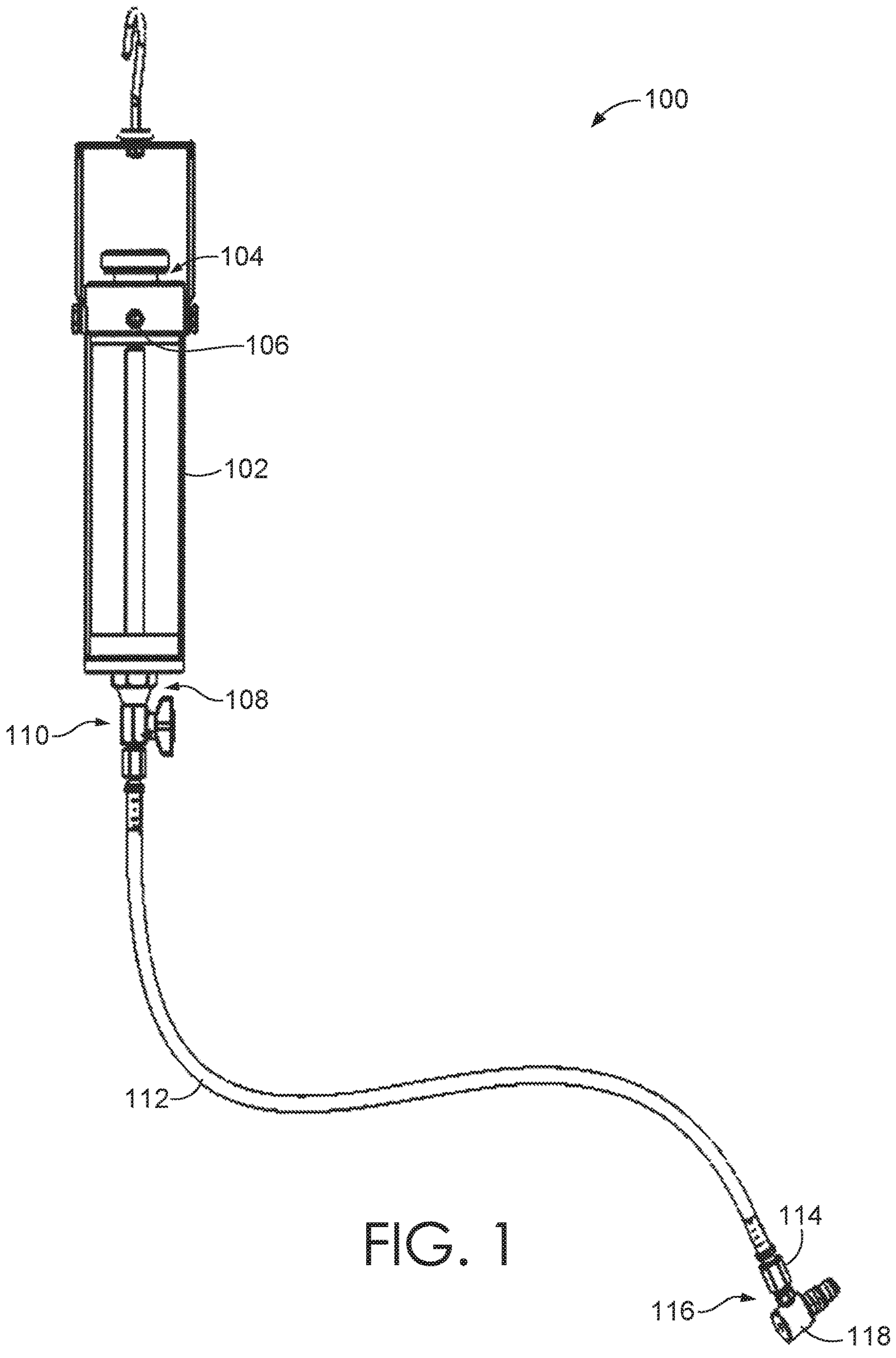
FIG. 1 is an illustration of an example gravity-fed cleaning tool or system configured to deliver a cleaning fluid into the air intake system of an engine, in accordance with embodiments of the present invention.

Referring now to the drawings, FIG. 1 illustrates a gravity-fed cleaning tool or system 100 configured to deliver a cleaning fluid into the air intake system of a GDI engine or other engine that might be serviced. The cleaning fluid might then help to remove deposits on the intake valves, on pistons and in the combustion chamber. At a high level, the system 100 includes a fluid dispenser 102 coupled with a hose 112, which includes a nozzle or other hose-end assembly configured to be inserted into a port of the GDI engine. In addition, the system 100 includes a first meter assembly 108, which is configured to control a flow of cleaning fluid from the fluid dispenser 102 into the hose 112, and a second meter assembly 116, which is configured to control a flow of cleaning fluid from the hose 112 into the engine.

The fluid dispenser 102 includes a lid 104 and an air vent 106 near a first end (e.g., the top end as the fluid dispenser is depicted in FIG. 1). The fluid dispenser 102 is a hollow container that may be filled with a cleaning fluid. In addition, the fluid dispenser 102 includes a debris filter screen 304 (e.g., FIG. 3 and FIG. 5) arranged near a second end (e.g., the bottom end as the fluid dispenser is depicted in FIG. 1) to filter the cleaning fluid of solid particles or debris prior to flowing into the hose 112 from the dispenser 102. In one aspect of the disclosure, the filter screen 304 is attached to the first meter assembly 108 by way of a filter bolt 302 (e.g., FIG. 3 and FIG. 5). The filter bolt 302 includes a filter-bolt fluid passage 303 (e.g., FIG. 5) having a first diameter, and the filter-bolt fluid passage 303 defines a channel through which cleaning fluid can pass when flowing from the fluid dispenser 102 to the hose 112.

Figure 2:
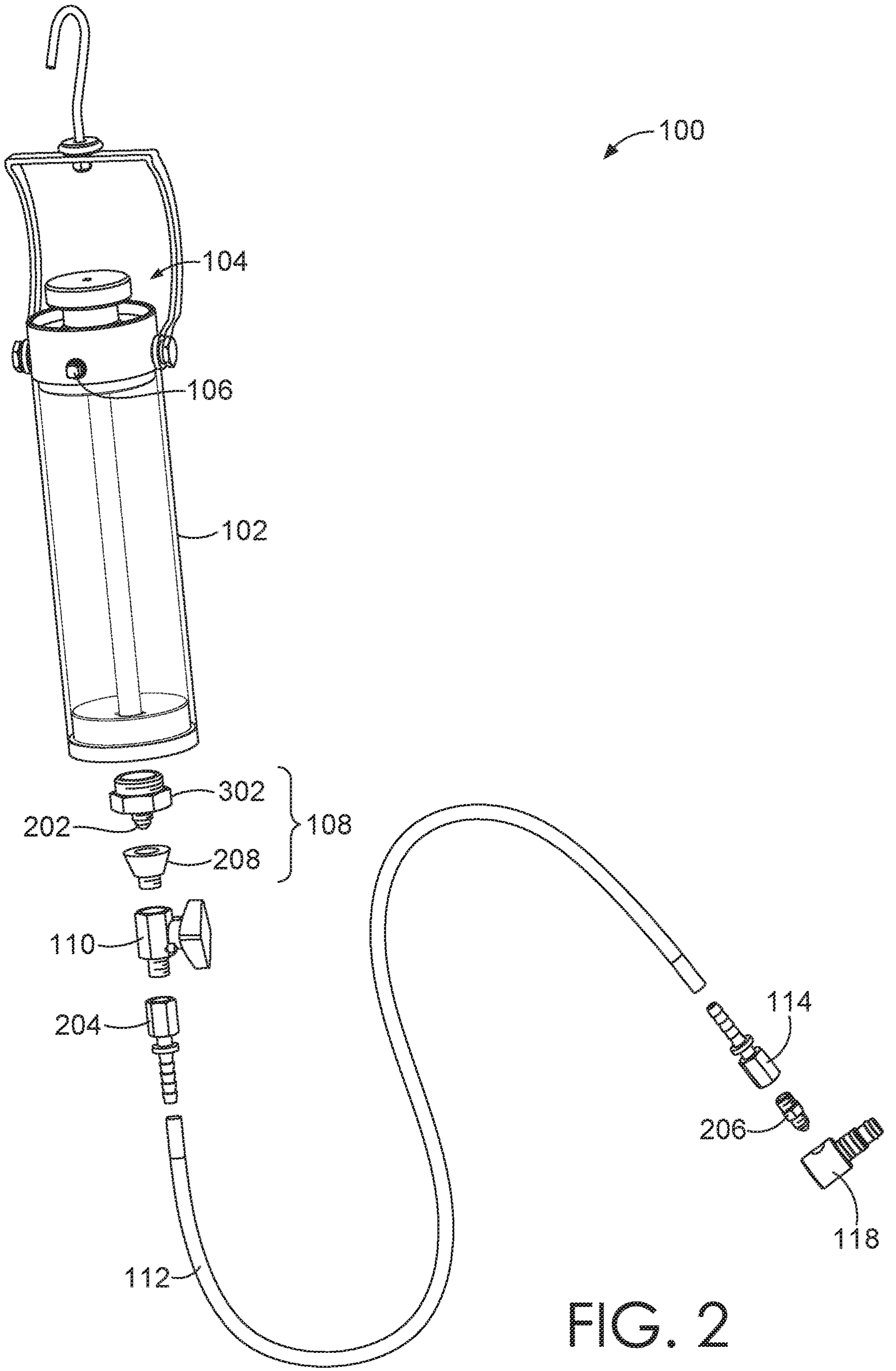
FIG. 2 is an exploded view of the gravity-fed cleaning tool of FIG. 1, in accordance with embodiments of the present invention.
Figure 3:
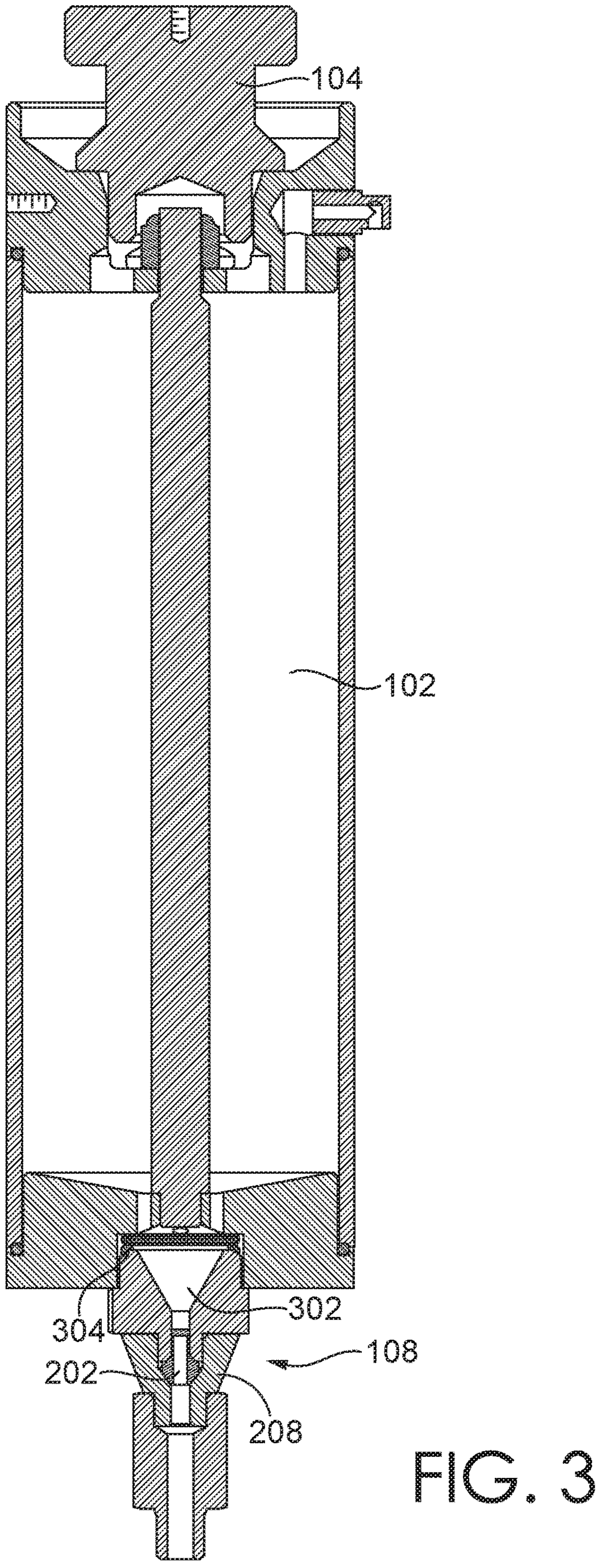
FIG. 3 is a cross-sectional view of an example fuel dispenser, in accordance with embodiments of the present invention.
Figure 4:
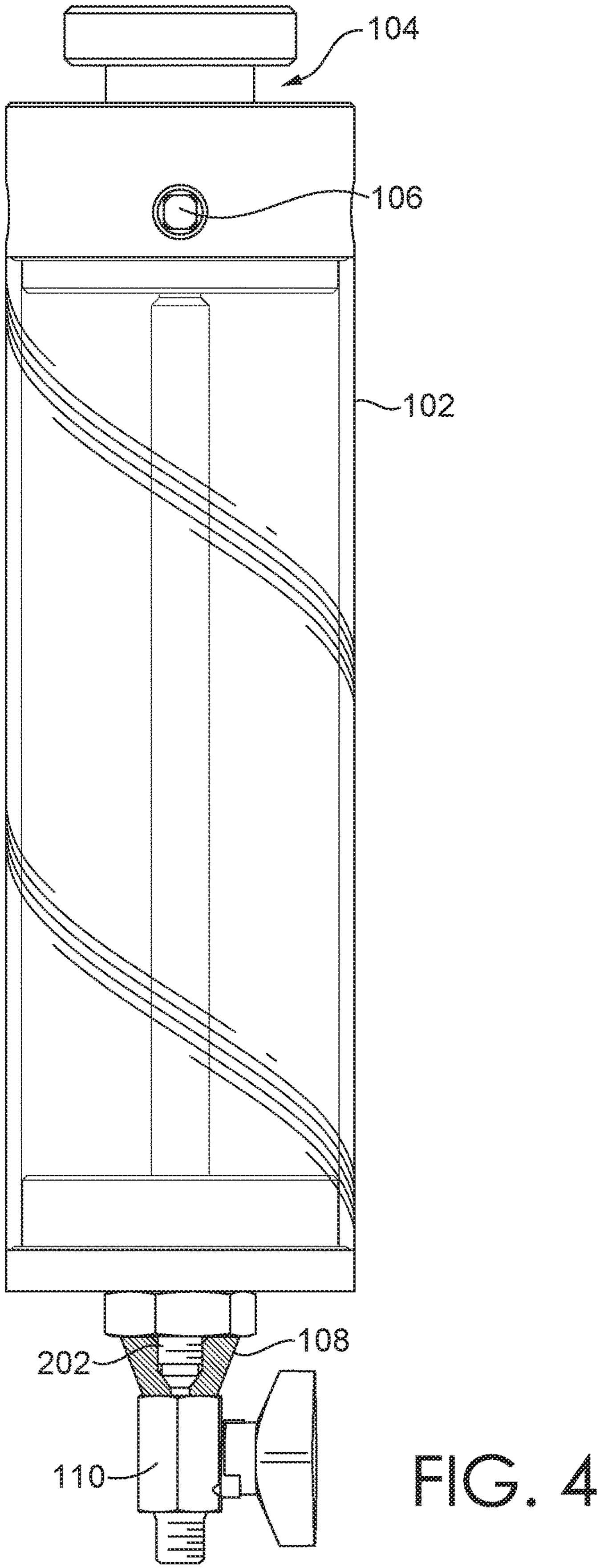
FIG. 4 is a side view of an example fuel dispenser, in accordance with embodiments of the present invention.
Figure 5:
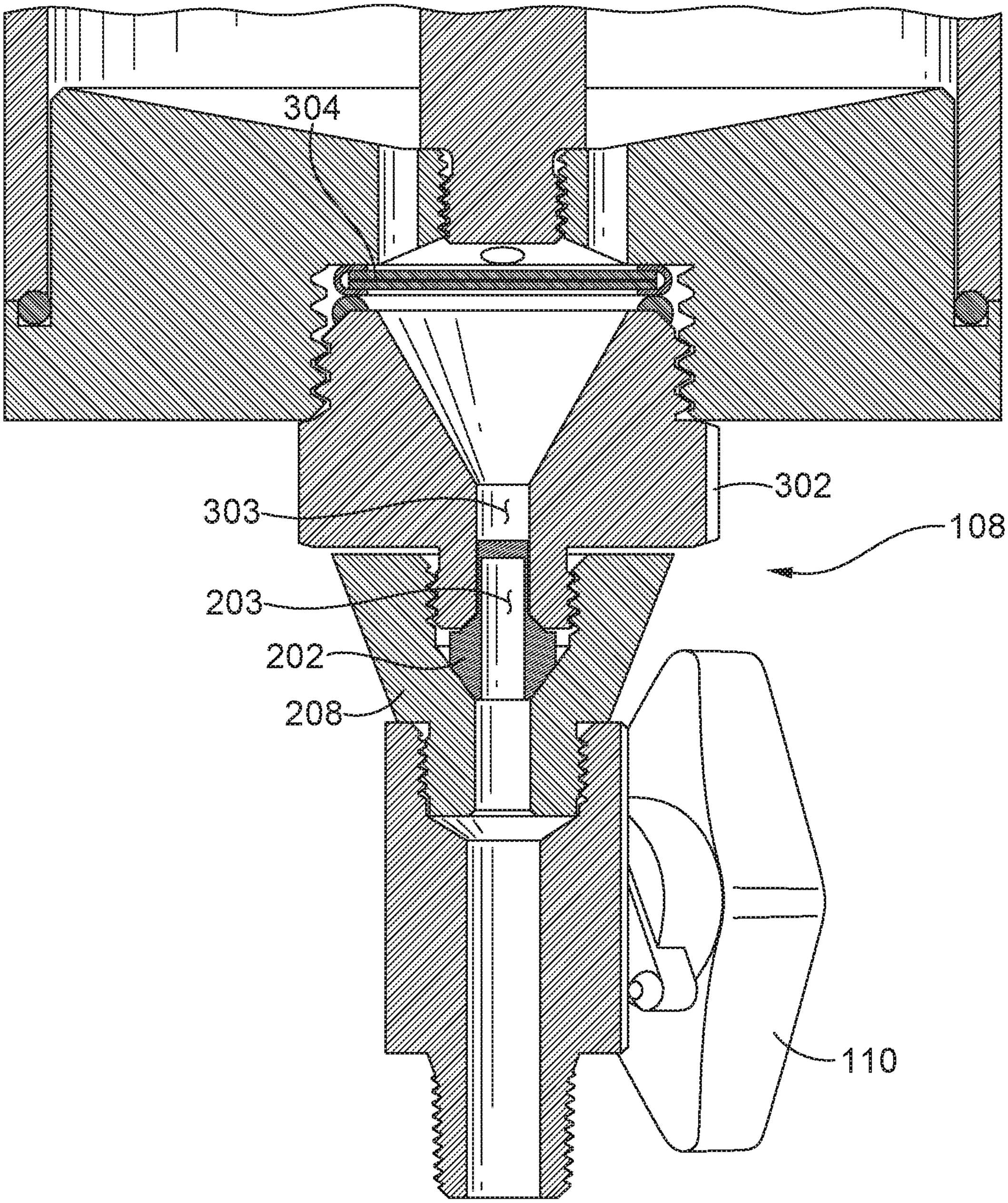
FIG. 5 is a cross-sectional view of an example meter assembly of a gravity-fed cleaning tool, in accordance with embodiments of the present invention.
Figure 6:
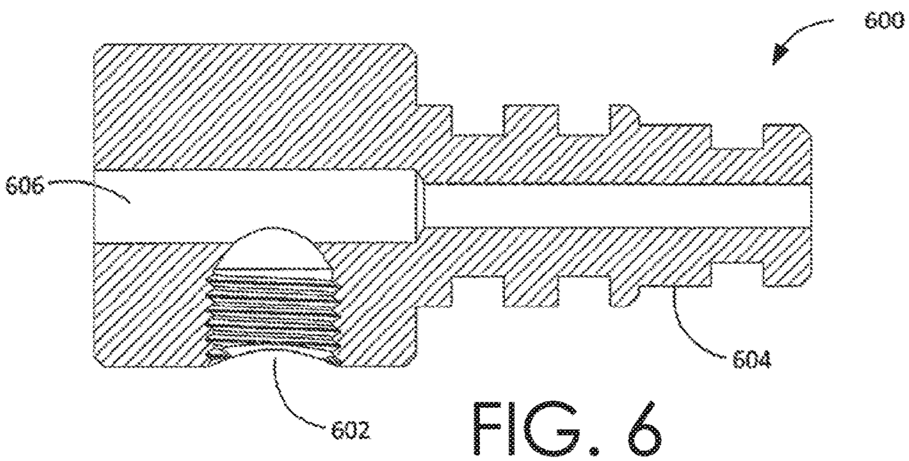
FIG. 6 is a cross-sectional view of an example venturi nozzle, in accordance with embodiments of the present invention.
Figure 8:
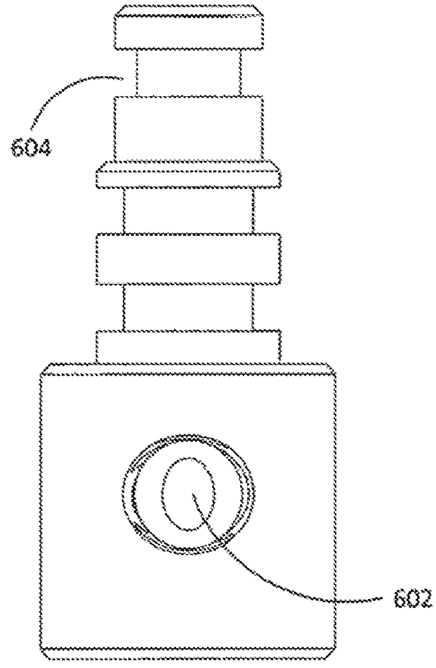
FIG. 8 is a side view of an example venturi nozzle, in accordance with embodiments of the present invention.
Figure 7:
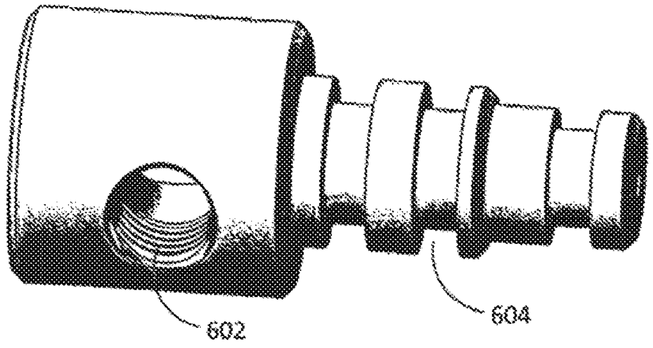
FIG. 7 is a perspective view of an example venturi nozzle, in accordance with embodiments of the present invention.

The first meter assembly 108 is generally configured to control a rate at which fluid passes from the fluid dispenser 102 to the hose 112, and this flow might result from the head pressure of the fluid in the second end of the dispenser 102. In one aspect of this disclosure, the first meter assembly 108 includes a fluid meter 202 coupled at a distal end (relatively farther away from the fluid dispenser) of the filter bolt 302. The fluid meter 202 includes a fluid-meter fluid passage 203 that defines a channel through which cleaning fluid can pass when exiting the filter-bolt fluid passage 303. In one embodiment, the diameter of the fluid-meter fluid passage 203 is smaller than the filter-bolt fluid passage 303, which might slow a flow rate of cleaning fluid exiting the filter-bolt fluid passage 303. In another aspect, a diameter of the fluid-meter fluid passage 203 may be tailored to specifically achieve a flow rate, and the size of this dimeter may control the flow of cleaning fluid from the dispenser 102 into the hose 112. In another aspect, the first meter assembly 108 may also include a ball valve 110, which may be attached to a proximal end of a hose 112 and might include an open position permitting fluid to flow from the first meter assembly 108 into the hose and a closed position blocking the flow of fluid. As shown in FIGS. 2, 3, and 5, the assembly may also include a ball-valve insert 208 controlling a flow of cleaning fluid into the ball valve 110. In addition, a barbed hose fitting 204 may connect the ball valve 110 to the hose 112.

As mentioned above, the system 100 also includes a second meter assembly 116, which is arranged at the hose-end assembly, and the second meter assembly 116 itself may include a type of nozzle 118 (e.g., FIGS. 1 and 2). The nozzle 118 may be interchangeable to allow for nozzles of different sizes to be coupled to the end of the hose 112. For example, one size of nozzle might be selected for one type of engine based on a size of the port, and a different nozzle size might be selected for a different engine having a different port size. This interchangability allows for a sealed connection to be formed with the port opening when the nozzle is inserted into the port. The second meter assembly 116 may also include another fluid meter 206 having a fluid channel or metered hole, which has a size relative to the fluid-meter fluid passage 203. For example, in one aspect a diameter of the fluid channel of the second fluid meter 206 is larger than the fluid-meter fluid passage 203. In another aspect, a diameter of the fluid channel of the second fluid meter 206 is smaller than the fluid-meter fluid passage 203. Further still, the diameter of the fluid channel of the second fluid meter 206 may be similar to the fluid-meter fluid passage 203. In one aspect of this disclosure, the relative sizing of the fluid channels of the fluid meter 202 and the fluid meter 206 is calibrated to achieve a desired flow rate.

In another aspect of the disclosure, the second meter assembly 116 might include a venturi nozzle 600 (e.g., FIGS. 6-9) or an aerosolizing nozzle 1000 (e.g., FIGS. 10-13). Referring now to FIGS. 6-9, the venturi nozzle 600 may be connected to an opening 902 (e.g., a vacuum port) of the air intake manifold of the GDI engine on one end 604 and to the hose 112 on the end 602. In operation, air is sucked into the venturi nozzle 600 through an opening at the distal end 606 by the GDI engine's vacuum at the intake manifold. When the air passes over the venturi nozzle 600, the nozzle mixes cleaning fluid coming from the hose 112 with the air and disperses it throughout the intake manifold of the GDI engine. This leads to the flow of the cleaning fluid being enhanced by the low pressure pull created by the air flow through the venturi nozzle 600.

Figure 9:
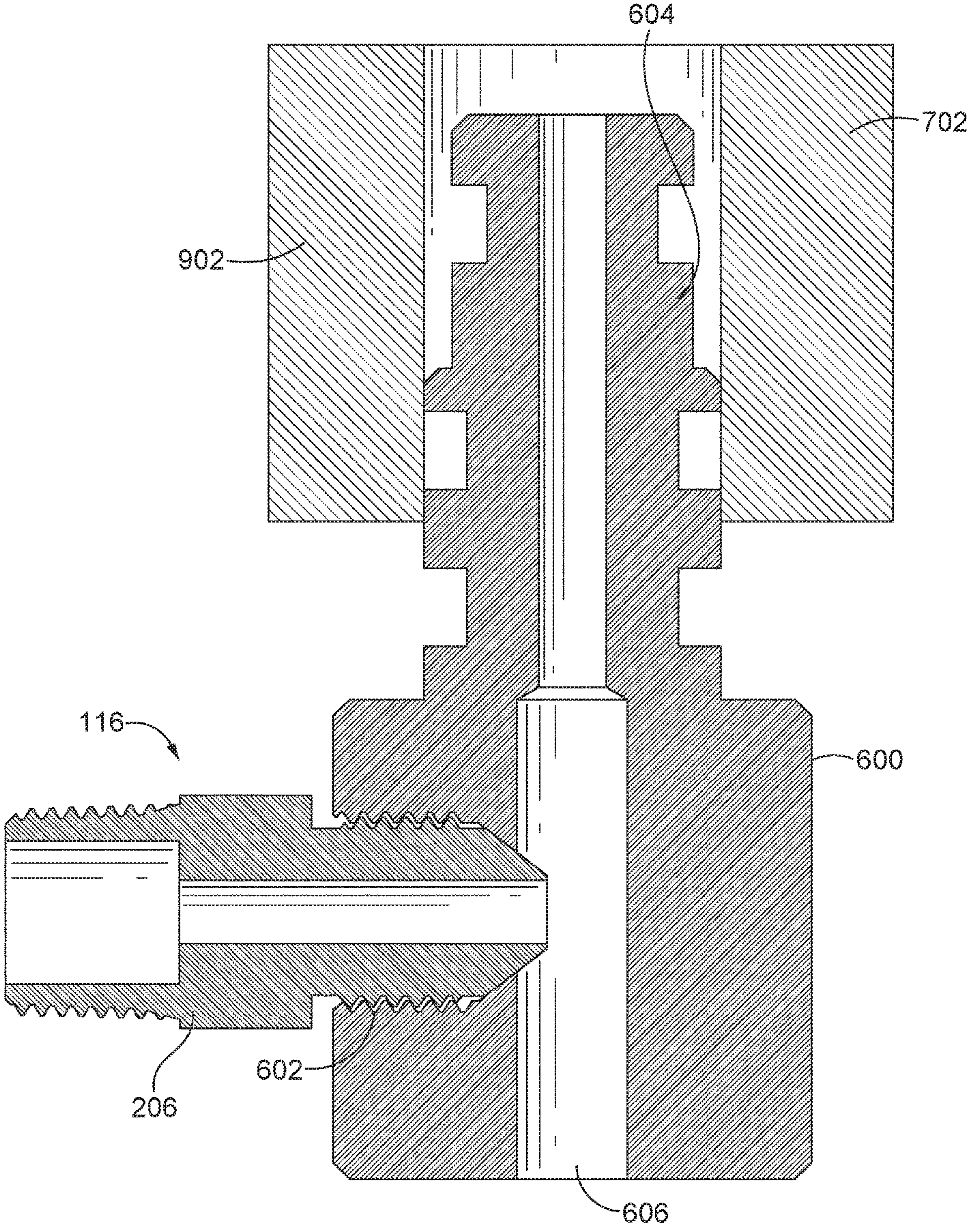
FIG. 9 is a cross-sectional view of an example venturi nozzle coupled with a distal end of a hose and a port of an engine, in accordance with embodiments of the present invention.
Figure 10:
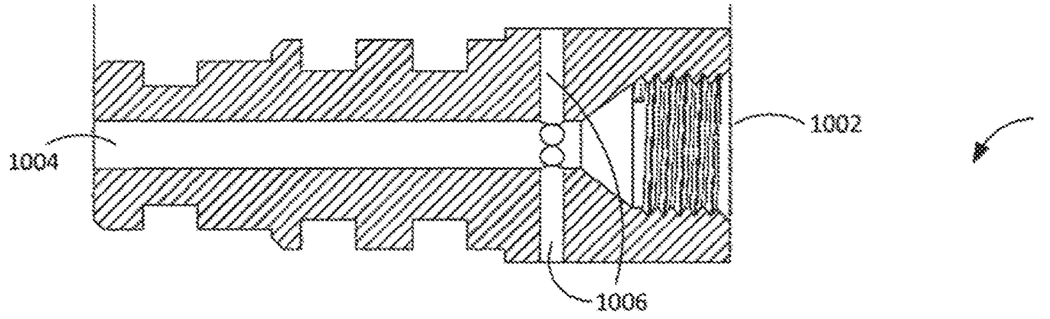
FIG. 10 is a cross-sectional view of an example aerosolizing nozzle, in accordance with embodiments of the present invention.
Figure 11:
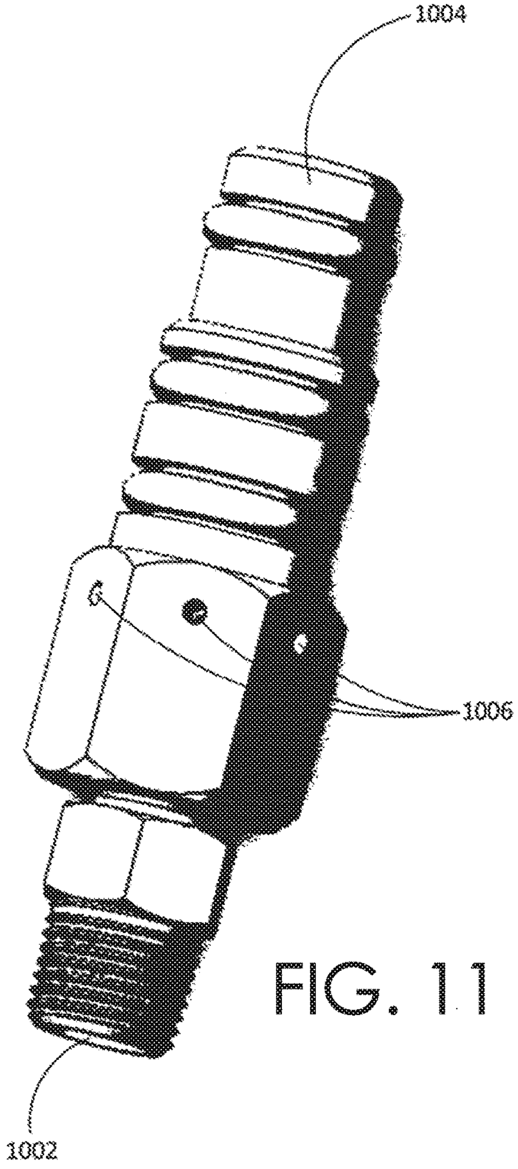
FIG. 11 is a perspective view of an example aerosolizing nozzle, in accordance with embodiments of the present invention.
Figure 12:
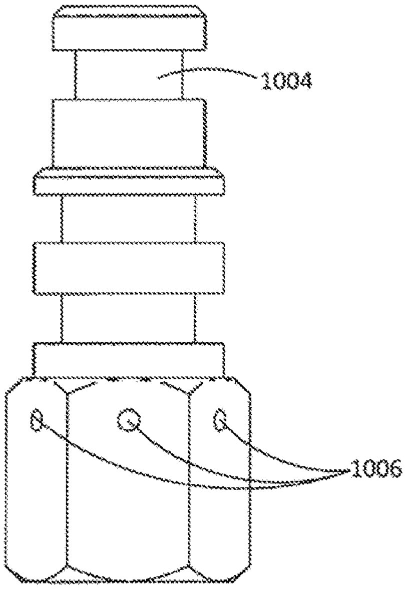
FIG. 12 is a side view of an example aerosolizing nozzle, in accordance with embodiments of the present invention.

As shown in FIG. 9, the fluid meter 206 may attach to the venture nozzle 600 by a threaded connection. However, other quick-change connections may also be used. The fluid meter 206 includes a fluid passage having a size calibrated to control a flow of cleaning fluid from the hose 112 into the nozzle 600. In addition, the fluid meter 206 may attach to another barbed hose fitting 114 (shown in FIG. 2). As explained in other portions of this disclosure, the size of the fluid passage of the fluid meter may be calibrated relative to a size of the other fluid meter 202, in order to regulate a flow across the system 100. In one aspect, a size of the fluid passage of the fluid meter 206 is larger than the fluid passage 203.

Referring now to FIGS. 10-13, the aerosolizing nozzle 1000 may be fitted at a top end 1004 to an opening 1302 (e.g., a vacuum port) of the air intake manifold of the GDI engine. The vacuum in the intake manifold of the GDI engine leads the aerosolizing nozzle 1000 to suck in air from holes 1006 arranged in a radial pattern circumscribing the nozzle, creating a turbulence in the nozzle when the engine is running. The turbulent air then mixes with the cleaning fluid coming in from the hose 112 that can be connected to bottom end 1002 of the aerosolizing nozzle 1000. However, here, the flow of the cleaning fluid may be reduced due to the swirling backpressure created by the structure of the aerosolizing nozzle 1000.

Figure 13:
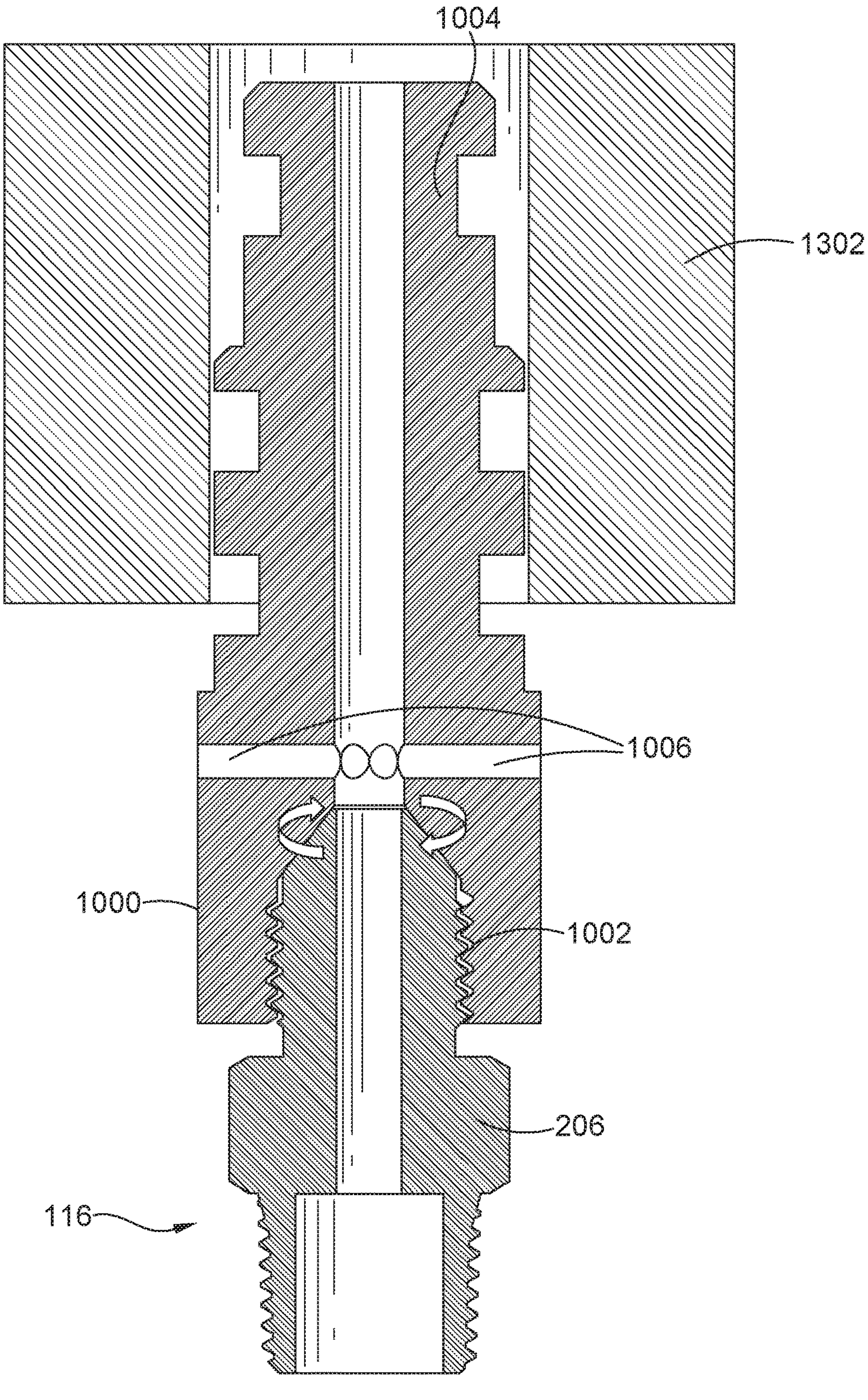
FIG. 13 is a cross-sectional view of an example aerosolizing nozzle coupled with a distal end of a hose and a port of an engine, in accordance with embodiments of the present invention.

As shown in FIG. 13, the fluid meter 206 may attach to the aerosolizing nozzle 1000 by a threaded connection. However, other quick-change connections may also be used. The fluid meter 206 includes a fluid passage having a size calibrated to control a flow of cleaning fluid from the hose 112 into the nozzle 1000. In addition, the fluid meter 206 may attach to another barbed hose fitting 114 (shown in FIG. 2). As explained in other portions of this disclosure, the size of the fluid passage of the fluid meter may be calibrated relative to a size of the other fluid meter 202, in order to regulate a flow across the system 100. In one aspect, a size of the fluid passage of the fluid meter 206 is larger than the fluid passage 203.

Having described structures of the system 100, some operations will now be described. In practice, the gravity-fed cleaning tool 100 may provide a non-pressurized tool. Because it is gravity based, the tool 100 provides a variable fluid flow rate to the fluid meter assembly 108 and, in turn, a variable flow to the hose 112. In other words, the fluid dispenser 102 utilizes gravity-based distribution, such that the flow of the cleaner fluid to the hose 112 is faster in the beginning of the cleaning process when the fluid dispenser 102 is full and the head pressure is higher. As the level of the cleaning fluid in the fluid dispenser 102 goes down, as well as the head pressure created by the fluid in the dispenser, the flow rate slows and the vacuum at the intake manifold port starts to pull the fluid to the engine when the engine is running. In addition, the air vent 106 allows air to enter the fluid dispenser 102 as the level of cleaning fluid in the fluid dispenser 102 goes down. This allows the fluid dispenser 102 to backfill with air to prevent a vacuum from forming and stopping the flow of fluid from the fluid dispenser 102. As such, the gravity-fed tool 100 allows for a higher cleaning fluid flow rate at the beginning of a cleaning cycle and a gradual decrease in the rate as the cleaning fluid is dispersed from the fluid dispenser 102 due to the gradual decrease in head pressure as the fluid level decreases in the fluid dispenser 102. This provides a high volume "soaking" of the deposits in the piston and the combustion engine in the beginning of the service and a gradual decrease of the cleaning fluid to a low volume mist towards the end of the cleaning cycle, ensuring that the combustion engine does not stall from too much cleaning product.

The meter assembly 116 controls the fluid flow to the engine based on the negative pressure from the vacuum created by the engine when it is running. In this way, the first meter assembly 108 and the second meter assembly 116 normalize the flow of the fluid regardless of the position of the hose 112. The meter assembly 108 restricts the cleaning fluid from flowing into the hose 112 too quickly (e.g., all at once) and allows the system 100 to better control the head pressure encountered by the metering assembly 116. The metered hole in the second meter assembly 116 controls the flow of the fluid (i.e., flow rate) into the GDI engine based on the size of the metered hole and the negative pressure generated by the GDI engine as it is running. The meter assembly 108 and the meter assembly 116, in combination, provide an efficient and ideal flow of the fluid to the GDI engine.

Generally, during the cleaning process, while the engine is running at operating temperature, the ball valve 110 is turned to an open position to allow the cleaning fluid to flow from the fluid dispenser 102 to the hose 112 from a combination of gravity and the negative pressure in the hose 112 created due to the vacuum in the engine when it is running. The negative pressure is generated from air being pulled into the engine to counteract the vacuum. The air passing through the second metering assembly 116 creates the negative pressure in the hose 112, which in turn draws the fluid of the fluid dispenser 102 into the hose 112, in combination with the gravity-based feed. As the volume of the cleaning fluid in the fluid dispenser 102 decreases, the flow of the fluid to the meter assembly 108 similarly decreases due to the consequent decrease in head pressure at meter assembly 108 from gravity. The meter assembly 108 and the meter assembly 116, in combination, provides an efficient and ideal flow of the fluid to the GDI engine.

The process of cleaning deposits on the intake valves and pistons and in the combustion chamber using the gravity-fed cleaning system 100 will now be described in accordance with an aspect of this disclosure. For example, as a first step, the meter assembly 116 is inserted into an opening (e.g., a vacuum port, such as 902 or 1302) of the air intake system of a GDI engine of a vehicle. In one aspect, the process is performed while the engine is running at operating temperature. For example, in some instance, the engine is running at the operating temperature between 65° Celsius (i.e., 149° Fahrenheit) to 105° Celsius (i.e., 221° Fahrenheit). In other examples, the engine may be warmed up for a desired amount of time prior to beginning the cleaning process. This creates and maintains a consistent vacuum in the engine, including the air intake system, which aerosolizes the cleaning fluid as it is dispersed into the intake port through the second meter assembly 116. In some examples, the vacuum in the engine is between 15 inches of mercury and 20 inches of mercury. Once the engine has reached a desired state (e.g., temperature), the service might proceed using the fluid dispenser 102, which distributes various amounts of cleaning fluid to different parts of the engine using the mechanisms described above. For example, the ball valve 110 may be turned to an open position, at which point the fluid dispenser 102 starts disbursing the cleaning fluid through a meter assembly 108.

At the beginning of the service, the head pressure is high in the fluid dispenser 102 and the gravity pulls the cleaning fluid through the first fluid meter assembly 108 at a high pressure and volume to the hose 112. As the cleaning fluid level in the fluid dispenser 102 goes down, the air vent 106 backfills the fluid dispenser 102 with air. The flow of the cleaning fluid to the hose 112 is metered by the fluid meter 202 located above the ball valve 110. The flow rate goes down as the cleaning fluid in the fluid dispenser 102 leaves the dispenser over time.

The cleaning fluid may also flow through the second meter assembly 116 attached to the opposite end of the hose 112. The second meter assembly 116 contains a metered hole having a size relative to the fluid meter 202. For example, the passage of the second meter assembly 116 might be bigger in size than the hole in the first fluid meter 202. The second meter assembly 116 meters the rate at which cleaning fluid is introduced to the engine. The second meter assembly 116 may be a nozzle (e.g., 600 or 1000). The cleaning fluid is introduced in the second meter assembly 116 which then mixes the cleaning fluid with air that is sucked into the second meter assembly 116 by the vacuum created in the intake manifold of the GDI engine. The air and the cleaning fluid are then sprayed out into the intake manifold of the GDI engine at a rate determined by the second meter assembly 116. The second meter assembly 116 may be a nozzle, such as nozzles 600 and/or 1000 (see above).

In one aspect, the service may be completed in a single cleaning cycle, which finishes once the fluid dispenser 102 is empty. The varied cleaning fluid flow rate is advantageous because it allows for a high volume of the cleaning fluid to flow into the intake manifold in the beginning when the head pressure in the fluid dispenser is higher. As such, it allows for fully coating and saturating of the deposits on the valve, piston and the combustion chamber, thereby also allowing for a longer cleaning fluid soak time of the deposit at those areas. This leads to more effective and efficient cleaning of the intake valves and the surrounding areas, including the piston and the combustion chamber. In other aspects, the process may be repeated if necessary to achieve desired cleaning results.

In one embodiment, once the engine is running, it is left idle and is revved one or more times after a set interval (e.g., every 45 seconds). In some examples, the engine is revved three times by snapping the throttle. In such examples, the engine is applied with an aggressive rev of 3500 RPM and then released. After the engine is through the three snap throttles, the engine is left idle for a set interval (e.g., 45 seconds) and then the throttling process is repeated. This revving process may be repeated throughout the cleaning process. The revving cycle keeps the cleaning fluid from puddling the air intake system and keeps the cleaning fluid moving through the intake manifold. When an engine is left idle for too long, the cleaning fluid collects at the bottom of the air intake system and does not get through the entire engine. Revving the engine at particular intervals prevents such puddling. Additionally, the revving moves the cleaning fluid over the intake valve, causing agitation at the site of movement, leading to removal of baked on deposits from the site (e.g., intake valve). This is advantageous because it leads to effective removal of deposits that the conventional processes (without revving cycles) do not provide. It increases the efficacy of the cleaning process.

In another embodiment, the process can be repeated for another cycle of cleaning if the engine is still dirty. In that case, the engine is left idling for a predetermined amount of time (e.g., 15 minutes) between cleaning cycles. Multiple cleaning cycles can be used as needed.

Some aspects of this disclosure have been described with respect to the examples provided by FIGS. 1-13. Additional aspects of the disclosure will not be described that may be related subject matter included in one or more claims of this application, or one or more related applications, but the claims are not limited to only the subject matter described in the below portions of this description. These additional aspects may include features illustrated by FIGS. 1-13, features not illustrated by FIGS. 1-13, and any combination thereof. When describing these additional aspects, reference may be made to elements depicted by FIGS. 1-13 for non-limiting, illustrative purposes.

As such, one aspect of the present disclosure includes a cleaning system for distributing a cleaning solution to an engine port, and examples of a cleaning system include, but are not limited to, each of the items identified by reference numerals 102, 106, 108, 110, 112, 114, 116, 202, 206. The cleaning system includes a fluid dispenser 102 containing a hollow body for receiving a cleaning fluid. The fluid dispenser 102 is connected to a first fluid meter 202. The first fluid meter includes a first metered hole 203 to meter a rate at which the cleaning fluid flows in a first end of a hose 112. The cleaning system also includes a second fluid meter 206 that is connected to a second end of the hose 112. The second fluid meter includes a second metered hole. Additionally, the second end is adapted to mix air and the cleaning fluid and to dispense the mixture. As explained in other parts of this disclosure, the configuration of the cleaning system might contribute to a variable flow rate of the cleaning fluid allowing for improved cleaning of the air intake system of an engine.

Another aspect of the present disclosure includes a method of cleaning engine intake valves and surrounding intake areas of an engine. A fluid-distribution system 100 is attached to a port of the engine. The fluid-distribution system 100 includes a cleaning-fluid dispenser 102 that contains a cleaning fluid and that is coupled to a hose 112. The fluid distribution system 100 also includes a first meter assembly 108 coupled at a first end of the hose 112 and between the cleaning-fluid dispenser 102 and the hose 112. The fluid-distribution system 100 also includes a second meter assembly 116 coupled to a second end of the hose 112 adapted to be inserted into the port of the engine. Next, the method includes creating a vacuum in the engine by running the engine. A negative pressure is created by vacuum and is exerted on the fluid-distribution system 100. The method further includes administering the cleaning fluid through the port and to the intake valves and surrounding intake areas of the engine. This is done through the first meter assembly 108 at gradually decreasing rate as a volume of the cleaning fluid in the cleaning-fluid dispenser 102 decreases using the first meter assembly 108 and the second meter assembly 116. As explained in other parts of this disclosure, the gradually decreasing rate of cleaning fluid entering the engine contributes to improved cleaning of the air intake system of the engine.

An additional aspect to the disclosure is directed to a gravity-fed cleaning apparatus for cleaning engine intake valves and surrounding intake areas. The gravity-fed cleaning apparatus has a fluid-dispersion container (e.g., fuel dispenser 102) having a hollow body for receiving a cleaning fluid, the body having an outlet (e.g., at end of fuel dispenser 102 fitted with filter 304), a liquid inlet aperture (e.g., lid 104) for permitting the cleaning fluid to enter the fluid-dispersion container, and one or more air inlet vents (e.g., air vents 106) permitting air to enter the fuel-dispersion container. Additionally, the gravity-fed cleaning apparatus includes a first fluid-flow controller (e.g., meter assembly 108). The first fluid-flow controller has a first liquid inlet connection (e.g., via filter bolt 302) and a first liquid outlet connection (e.g., fluid meter 206). The first liquid inlet connection is connected to the liquid outlet aperture of the fluid-dispersion container (e.g., filter bolt 302 connection to second end of dispenser 102). Further, the first fluid-flow controller including a metering assembly (e.g., fluid meter 202) configured to control a flow of the cleaning liquid into a first end of a hose (e.g., hose 112) connected to the liquid outlet connection of the liquid flow controller. In addition, the gravity-fed cleaning apparatus (e.g., system 100) also has a second fluid-flow controller (e.g., meter assembly 116). The second fluid-flow controller has a second liquid inlet connection (e.g., second fluid meter 206) and a second liquid outlet connection (e.g., end 604, end 1004). The second liquid inlet connection is connected to a second end of the hose (e.g., hose 112 by way of the hose fitting 114). Also, the second fluid-flow controller includes another metering assembly (e.g., fluid meter 206) configured to control the flow of the cleaning liquid out of the second liquid outlet connection.

From the foregoing, it will be seen that this invention is one well adapted to attain all ends and objects hereinabove set forth together with the other advantages which are obvious and which are inherent to the method and apparatus. It will be understood that certain features and subcombinations are of utility and may be employed without reference to other features and subcombinations. This is contemplated by and is within the scope of the present invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A system for distributing a cleaning fluid to an engine port, the system comprising:

a fluid dispenser containing a hollow body for receiving the cleaning fluid, the fluid dispenser including a vent, wherein:

the fluid dispenser comprises a first opening and a lid removably securable in the first opening, and the vent comprises a second opening of the fluid dispenser that permits air to passively enter the fluid dispenser when the lid is secured in the first opening;

a first fluid meter assembly comprising:

a first fitting coupled to the fluid dispenser and comprising a first fluid passage, which conically tapers from a wider passage closer to the fluid dispenser to a narrower passage farther from the fluid dispenser, the first fitting comprising a male connector with external threads;

a fluid meter fitting coupled inside the first fluid passage to the first fitting and comprising a second fluid passage that is in fluid communication with the first fluid passage; and a second fitting comprising a female connector with internal threads, which are coupled to the external threads of the male connector of the first fitting and comprising a third fluid passage in fluid communication with the first fluid passage and the second fluid passage, the fluid meter fitting being positioned between the first fitting and the second fitting, the second fitting being coupled to a valve, which attaches to a first end of a hose;

a second fluid meter assembly connected to a second end of the hose; and the second fluid meter assembly adapted to mix air and the cleaning fluid and to dispense the mixture.

2. The system of claim 1, wherein:

the first fluid passage comprises a first diameter;

the second fluid passage comprises a second diameter; and the second diameter is smaller than the first diameter.

3. The system of claim 1, wherein the second fluid meter assembly comprises a second fluid meter coupled to a nozzle, and wherein the second fluid meter comprises:

a first end coupled to the second end of the hose and a second end coupled to the nozzle, and a fourth fluid passage connecting the first end to the second end, and the fourth fluid passage comprising a larger diameter associated with the first end and a smaller diameter associated with the second end.

4. The system of claim 1, wherein the second fluid meter assembly comprises an aerosolizing nozzle.

5. The system of claim 1, where the second fluid meter is a venturi nozzle.

6. The system of claim 1, wherein the valve comprises a ball valve, the ball valve having an open position and a closed position.

7. The system of claim 6, wherein the ball valve in the open position allows the cleaning fluid to flow from the fluid dispenser to the hose at a flow rate, the flow rate being determined at least in part by a second diameter of the second fluid passage.

8. The system of claim 1, wherein:

the first fluid passage comprises a first diameter;

the second fluid passage comprises a second diameter;

the third fluid passage comprises a third diameter; and the second diameter is smaller than the first diameter and the third diameter.

9. The system of claim 1, wherein the second fluid meter assembly is configured to control a rate at which the cleaning fluid enters the engine port as a result of a negative head pressure created by an engine that is running.

10. The system of claim 1, wherein the system distributes the cleaning fluid into the engine port at a gradually decreasing flow rate.

11. A gravity-fed cleaning apparatus for cleaning engine intake valves and surrounding intake areas, the apparatus comprising:

a fluid-dispersion container having a hollow body for receiving a cleaning fluid, the body having an outlet, a liquid inlet aperture for permitting the cleaning fluid to enter the fluid-dispersion container, and an air inlet vent permitting air to enter the fluid-dispersion container while the cleaning fluid exits the fluid- dispersion container through the outlet, wherein:

the liquid inlet aperture comprises a first opening and a lid removably secured in the first opening, and the air inlet vent comprise a second opening that is separate from the first opening and that permits air to enter the fluid-dispersion container and to exit the fluid-dispersion container when the lid is secured in the first opening;

a first fluid-flow controller having a first liquid inlet connection and a first liquid outlet connection, the first liquid inlet connection connected to the outlet of the fluid-dispersion container, the first fluid-flow controller including a metering assembly comprising:

a first fitting coupled to the fluid-dispersion container and comprising a first fluid passage;

a fluid meter fitting coupled to the first fitting and comprising a second fluid passage that is in fluid communication with the first fluid passage; and a second fitting coupled to the first fitting and comprising a third fluid passage in fluid communication with the first fluid passage and the second fluid passage, the fluid meter fitting being positioned between the first fitting and the second fitting, the second fitting being coupled to a valve, which attaches to a first end of a hose, wherein the fluid meter fitting comprises: a first portion that is inserted into, and contained within, the first fluid passage; a second portion that comprises a first chamfered face, which abuts the first fitting; and a second chamfered face that abuts the second fitting; and a second fluid-flow controller having a second liquid inlet connection and a second liquid outlet connection, the second liquid inlet connection connected to a second end of the hose, the second fluid-flow controller including another metering assembly configured to control the flow of the cleaning fluid out of the second liquid outlet connection.

12. The system of claim 1, wherein the first opening is in a top of the fluid dispenser and the vent is on a side of the fluid dispenser.

13. The system of claim 1, wherein the first fluid meter assembly consists essentially of the first fitting, the fluid meter fitting, and the second fitting coupled to the valve.

14. The system of claim 1, wherein the first opening opens to a first portion of the hollow body and the second opening opens to a second portion of the hollow body that is different than the first portion.

15. The system of claim 1, wherein the second opening is configured to permit air to enter the fluid dispenser and to exit the fluid dispenser.

16. The system of claim 1, wherein the second opening is unobstructed.

17. The apparatus of claim 11, wherein:

the another metering assembly comprises a second fluid meter coupled to a nozzle;

the second fluid meter comprises a fluid passage having a first longitudinal orientation; and the nozzle comprises a fluid passage comprising a second longitudinal orientation, which is perpendicular to the first longitudinal orientation.

18. The system of claim 1, wherein the fluid meter fitting comprises: a first portion that is inserted into, and contained within, the first fluid passage; a second portion that comprises a first chamfered face, which abuts the first fitting; and a second chamfered face that abuts the second fitting.

19. The system of claim 3, wherein:

the fourth fluid passage comprises a first longitudinal orientation; and the nozzle comprises a fifth fluid passage comprising a second longitudinal orientation, which is perpendicular to the first longitudinal orientation.

20. The system of claim 1, wherein:

the second fluid meter assembly comprises a second fluid meter and a nozzle;

the nozzle comprises an insertion end configured to be inserted into the engine port, a distal end opposite the insertion end, a fourth fluid passage extending from the insertion end to the distal end, and an opening that extends through a side wall of the nozzle and intersects with the fourth fluid passage; and the second fluid meter is coupled in the opening.

* * * * *